(12) United States Patent
Guo et al.

(10) Patent No.: US 10,156,657 B2
(45) Date of Patent: *Dec. 18, 2018

(54) SYSTEM AND METHOD OF DETERMINING A VALUE INDICATIVE OF HYDROGEN INDEX

(71) Applicant: Halliburton Energy Services, Inc., Houston, TX (US)

(72) Inventors: Weijun Guo, Houston, TX (US); Daniel F. Dorffer, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,103

(22) PCT Filed: Apr. 10, 2013

(86) PCT No.: PCT/US2013/035887
§ 371 (c)(1),
(2) Date: Sep. 9, 2014

(87) PCT Pub. No.: WO2013/158427
PCT Pub. Date: Oct. 24, 2013

(65) Prior Publication Data
US 2015/0041633 A1    Feb. 12, 2015

Related U.S. Application Data

(60) Provisional application No. 61/635,524, filed on Apr. 19, 2012.

(51) Int. Cl.
*G01V 5/10*    (2006.01)

(52) U.S. Cl.
CPC .............. *G01V 5/102* (2013.01); *G01V 5/101* (2013.01); *F04C 2270/041* (2013.01)

(58) Field of Classification Search
CPC ............................... G01V 5/101; G01V 5/102
See application file for complete search history.

(56) References Cited

U.S. PATENT DOCUMENTS

| 4,645,926 A | 2/1987 | Randall |
| 2005/0067160 A1 | 3/2005 | Jacobson |

(Continued)

FOREIGN PATENT DOCUMENTS

| EP | 0640848 A1 | 8/1993 |
| WO | 2010071626 A1 | 6/2010 |

(Continued)

OTHER PUBLICATIONS

Extended European Search Report Issued in European Application No. 13777933.6, dated Aug. 28, 2015 (6 Pages).

(Continued)

*Primary Examiner* — David Porta
*Assistant Examiner* — Mindy Vu
(74) *Attorney, Agent, or Firm* — Chamberlain Hrdlicka

(57) ABSTRACT

Determining a value indicative of hydrogen index. At least some of the example embodiments are methods including obtaining an inelastic count rate and a capture count rate of a gamma detector for a particular borehole depth in a formation, calculating a ratio of an inelastic count rate to a capture count rate for the particular borehole depth, and determining a value indicative of hydrogen index based on the ratio of the inelastic count rate to the capture count rate for the particular borehole depth.

20 Claims, 6 Drawing Sheets

(56) References Cited

U.S. PATENT DOCUMENTS

| | | |
|---|---|---|
| 2006/0284066 A1 | 12/2006 | Jacobson et al. |
| 2009/0026359 A1 | 1/2009 | Stephenson et al. |
| 2010/0292927 A1 | 11/2010 | Jacobson et al. |
| 2012/0016588 A1* | 1/2012 | Evans .................... G01V 5/104 702/8 |
| 2012/0197529 A1* | 8/2012 | Stephenson ............ G01V 5/101 702/8 |
| 2013/0211724 A1* | 8/2013 | Fitzgerald .............. G01V 5/105 702/8 |

FOREIGN PATENT DOCUMENTS

| | | | |
|---|---|---|---|
| WO | WO 2012012101 A2 | 1/2012 |
| WO | 2012012101 A2 | 1/2016 |

OTHER PUBLICATIONS

PCT Search Report and Written Opinion, PCT Application No. PCT/US2013/035887, dated Jul. 26, 2013.

* cited by examiner

US 10,156,657 B2

SYSTEM AND METHOD OF DETERMINING A VALUE INDICATIVE OF HYDROGEN INDEX

CROSS-REFERENCE TO RELATED APPLICATIONS

None.

BACKGROUND

Well logging is a technique used to identify characteristics of earth formations surrounding a borehole. The interrogation of a formation surrounding a borehole to identify one or more characteristics may be by sound, electrical current, electromagnetic waves, or high energy nuclear particles (e.g., gamma particles and neutrons). Receiving the interrogating particle or signal, and determining a formation property from such particle or signal, is in many cases a complicated endeavor. Any system or method that simplifies the detection of interrogating particle or signals, and thus simplifies determination of formation property, provides a competitive advantage in the marketplace.

BRIEF DESCRIPTION OF THE DRAWINGS

For a detailed description of exemplary embodiments, reference will now be made to the accompanying drawings in which:

FIG. 8 shows a computer system in accordance with at least some embodiments.

NOTATION AND NOMENCLATURE

Figure 1:
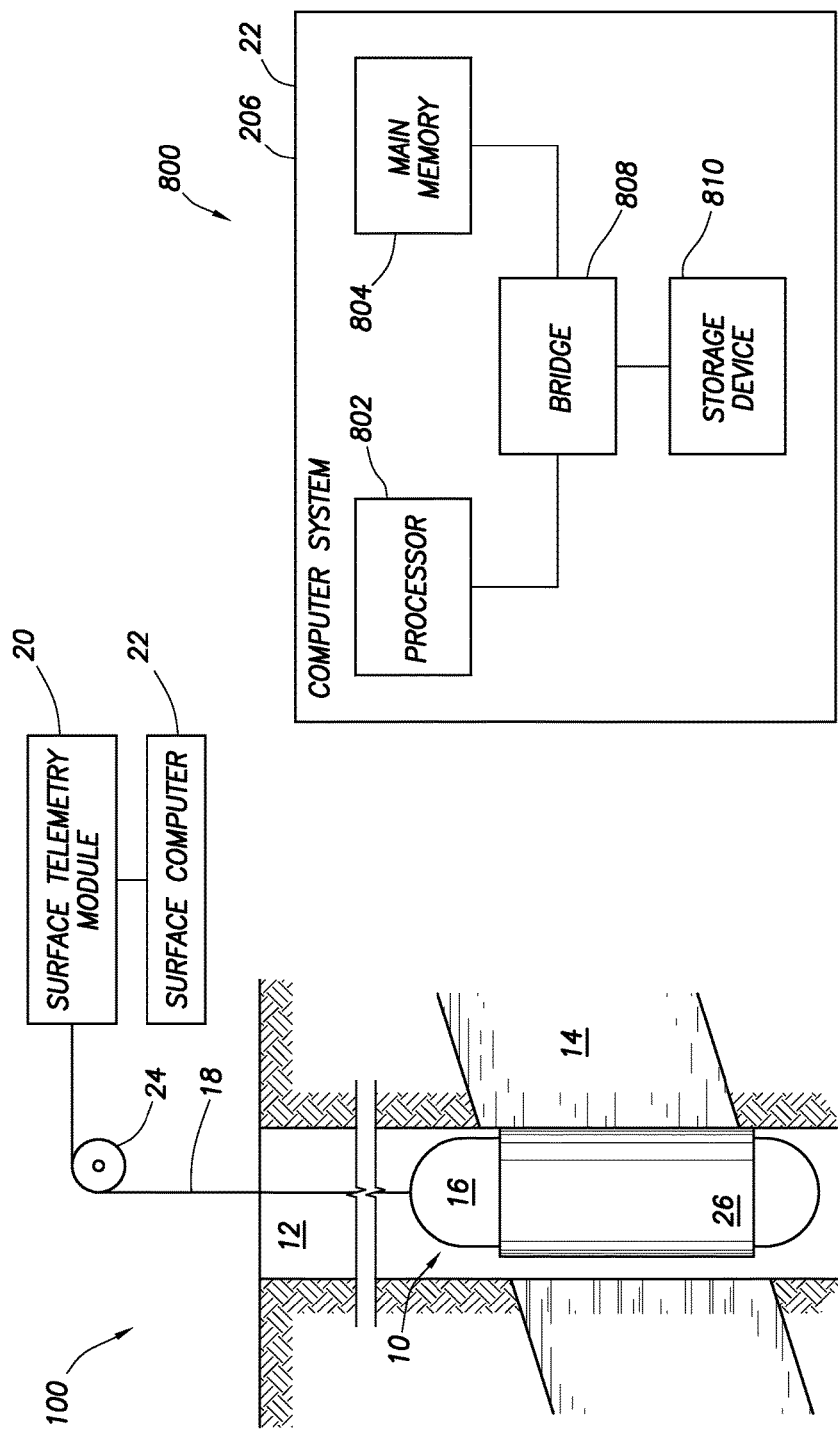
FIG. 1 shows a system in accordance with at least some embodiments.

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy in the form of electromagnetic radiation created and/or released due to neutron interaction with atoms, and in particular atomic nuclei, and shall include such energy whether such energy is considered a particle (i.e., gamma particle) or a wave (i.e., gamma ray or wave).

"Inelastic count rate" shall mean a gamma count rate during periods of time when gammas created by inelastic collisions are the predominant gammas created and/or counted (e.g., during the neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as capture count rate.

"Gamma count rate decay curve" shall mean, for a particular gamma detector, a plurality of count values, each count value based on gammas counted during a particular time bin. The count values may be adjusted up or down to account for differences in the number of neutrons giving rise to the gammas or different tools, and such adjustment shall not negate the status as a "gamma count rate decay curve."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of wireline logging tools, and thus the description that follows is based on the developmental context; however, the various systems and methods find application not only in wireline logging tools, but also measuring-while-drilling (MWD) and logging-while-drilling tools (LWD). Further still, the various embodiments also find application in "slickline" tools, in which the logging tool is placed downhole (e.g., as part of a drill string, or as a standalone device) and the logging tool gathers data that is stored in a memory within the device (i.e., not telemetered to the surface). Once the tool is brought back to the surface, the data is downloaded, some or all the processing takes place, and the logging data is printed or otherwise displayed. Thus, the developmental context shall not be construed as a limitation as to the applicability of the various embodiments.

Formation porosity is one of the most important petrophysical parameters for reservoir characterization. A pulsed-neutron tool is sensitive to formation hydrogen index, from which, with additional information and/or assumptions regarding the formation, a porosity value can be inferred. Table 1 presents representative hydrogen index and bulk density values for reservoirs with different fluid saturation values.

TABLE 1

Hydrogen index and bulk density values for reservoirs with different fluid saturation values. Representative values of hydrogen index and bulk density are shown for sandstone formations having various porosities, salt water (Sw) content, and hydrocarbon constituent. While Table 1 illustrates many relationships of the variables, notice how Hydrogen Index increases with increasing porosity.

| Lithology | Porosity (pu) | Hydrocarbon | Sw (%) | Water Salinity | Hydrogen Index | Bulk Density (g/cc) |
|---|---|---|---|---|---|---|
| Sandstone | 10 | Gas | 40 | Low | 0.060 | 2.434 |
| Sandstone | 10 | Gas | 90 | Low | 0.093 | 2.477 |
| Sandstone | 25 | Heavy Oil | 10 | Low | 0.275 | 2.211 |
| Sandstone | 25 | Heavy Oil | 90 | Low | 0.252 | 2.235 |
| Sandstone | 25 | Light Oil | 10 | Low | 0.251 | 2.164 |
| Sandstone | 25 | Light Oil | 90 | Low | 0.250 | 2.229 |
| Sandstone | 25 | Light Oil | 10 | High | 0.250 | 2.167 |
| Sandstone | 25 | Light Oil | 90 | High | 0.240 | 2.255 |

The various embodiments are directed to computing values indicative of hydrogen index using a pulsed-neutron tool. Measurement sensitivity is especially good when source-to-detector spacing is reasonably long. Compared to various related-art techniques using capture ratios between two gamma detectors, the various embodiments enable improved hydrogen index sensitivity for formations of medium to high porosities based on ratios of capture gammas to inelastic gammas measured at a single detector. The specification first turns to an illustrative system.

FIG. 1 illustrates a nuclear logging system 100 constructed in accordance with a least some embodiments. In particular, system 100 comprises a logging tool 10 placed within a borehole 12 proximate to a formation 14 of interest. The tool 10 comprises a pressure vessel 16 within which various subsystems of the tool 10 reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel). In some embodiments, the pressure vessel 16 may be covered with a thermal neutron absorptive material 26 (the thickness of which is exaggerated for clarity of the figure); however, in other embodiments the material 26 may be only partially present or omitted altogether.

Figure 2:
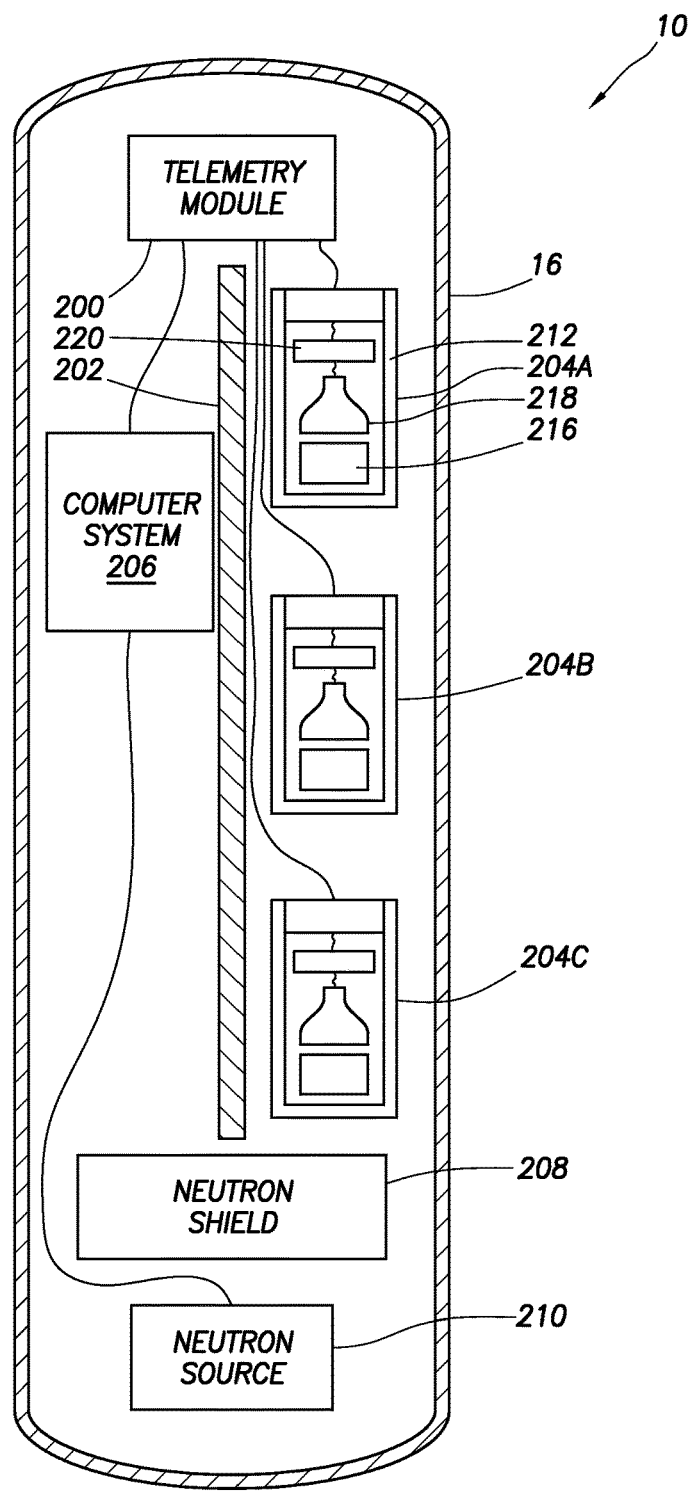
FIG. 2 shows a simplified cross-sectional view of a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, borehole shield 202, a plurality of gamma detectors 204 (in this illustrative case three gamma detectors labeled 204A, 204B and 204C), computer system 206, a neutron shield 208 and a neutron source 210. While the gamma detectors 204 are shown above the neutron source 210, in other embodiments the gamma detectors may be below the neutron source. In at least some embodiments, gamma detector 204C may be disposed in the range from about 6 inches to 18 inches from neutron source 210. In at least some embodiments, gamma detector 204B may be in the range of 18 inches to 30 inches from the neutron source 210. The gamma detector 204A may be on the order of 32.5 to 36 inches from the neutron source 210. Other spacing may be equivalently used, however. Neutron shield 202 may make the gamma detectors 204 receive more favorably formation-sourced gammas (as opposed to borehole-sourced gammas), and the shield may be a high density material (e.g., HEVIMET® available from General Electric Company of Fairfield, Conn.).

In some embodiments the neutron source 210 is a Deuterium/Tritium neutron generator. The neutron source 210, under command from surface computer 22 in the case of wireline tools, or computer system 206 within the tool in the case of MWD, LWD or slickline tools, generates and/or releases energetic neutrons. In order to reduce the irradiation of the gamma detectors 204 and other devices by energetic neutrons from the neutron source 210, neutron shield 208 (e.g., HEVIMET®) separates the neutron source 210 from the gamma detectors 204. Because of the speed of the energetic neutrons (e.g., 30,000 kilometers/second or more), and because of collisions of the neutrons with atomic nuclei which collisions change the direction of motion of the neutrons (commonly referred to as scattering), a neutron flux is created around the logging tool 10 that extends into the formation 14.

Neutrons generated and/or released by the source 210 interact with atoms by way of inelastic collisions, elastic scattering and/or thermal capture. In the case of inelastic collisions, a neutron collides with an atomic nucleus and a gamma is emitted (an inelastic gamma) when the struck nucleus, having been raised to an excited state, decays. The energy of the neutron is also reduced accordingly. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma. Further when high-energy neutrons scatter with lighter earth elements, such as Hydrogen, an elastic collision ensues and the energy loss by the neutron may be quite large; the energy lost by the neutron being carried off by the recoiling nucleus. A neutron may continue to slow down and lose energy via one or more elastic collisions with light nuclei (which do not generate gammas) until it reaches thermal energy level.

After one or more inelastic and/or elastic collisions (and corresponding loss of energy) a neutron reaches an energy known as thermal energy (i.e., a thermal neutron). At thermal energy a neutron can be captured by atomic nuclei. In a capture event, the capturing atomic nucleus enters an excited state and the nucleus later transitions to a lower energy state by release of a gamma (known as a thermal gamma or capture gamma). At least some of the thermal gammas created by thermal capture are also incident upon the gamma detectors 204. One or both of the arrival time of a particular gamma and its energy may be used to determine status as a capture gamma.

Still referring to FIG. 2, when operational the gamma detectors 204 detect arrival and energy of gammas. Referring to gamma detector 204A as indicative of all the gamma detectors 204, a gamma detector comprises an enclosure 212, and within the enclosure 212 resides; a crystal 216 (e.g., a one inch by six inch yttrium/gadolinium silicate scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200 in the case of a wireline tool, or to the computer system 206 within the tool in the case of a MWD, LWD or slickline tool.

Figure 3:
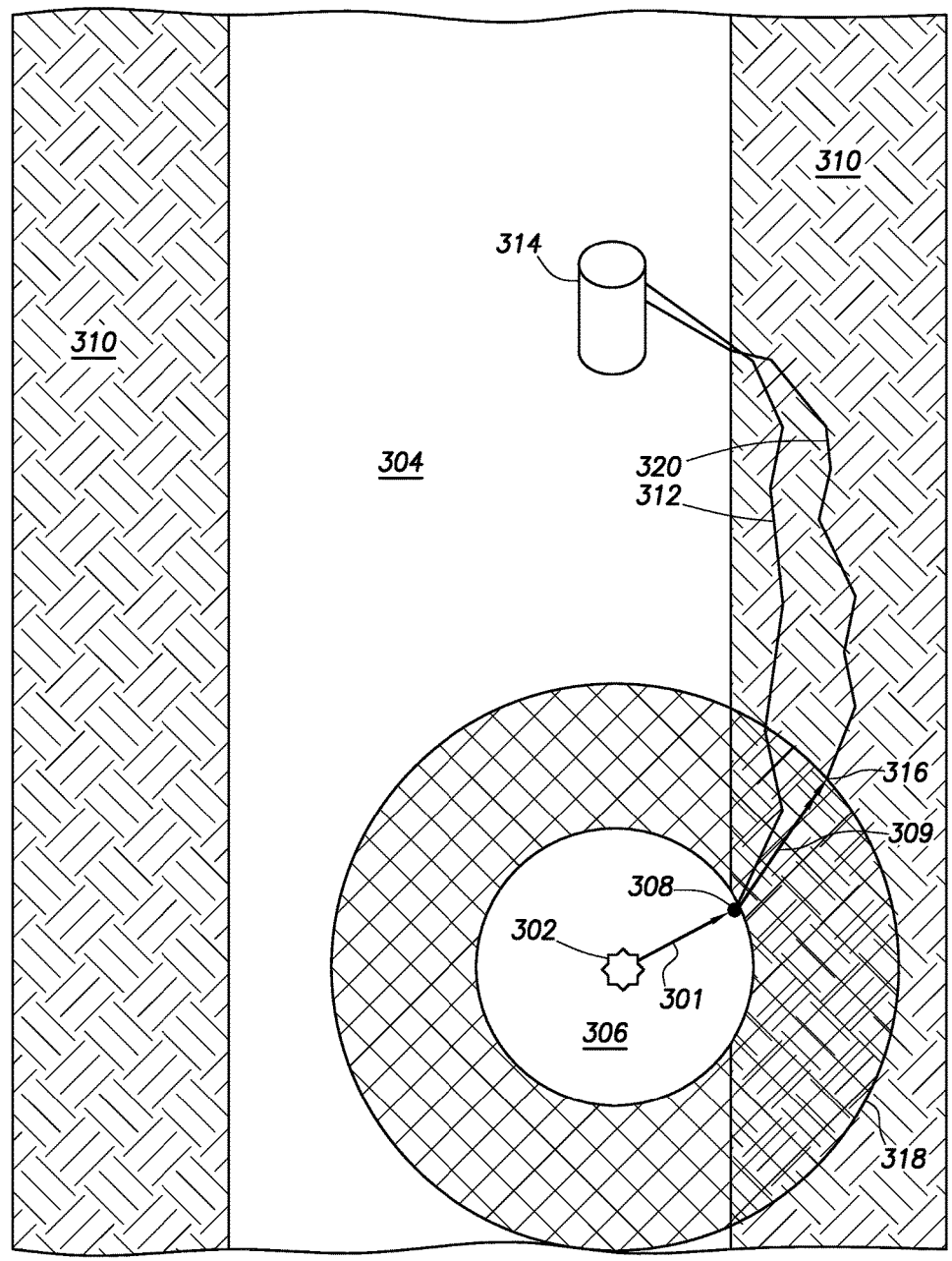
FIG. 3 shows a graphic delineating differences in source volume for inelastic and capture gammas in accordance with at least some embodiments.

In order to discuss the concepts of source volumes for different types of gammas, reference is made to FIG. 3. In particular, FIG. 3 shows a cross-sectional elevation view of a formation 310 penetrated by a borehole 304. Within the borehole 304 are a neutron source 302 and a gamma detector 314, the gamma detector 314 illustratively at a distance above the neutron source 302. Generation and/or release of neutron can be considered to create a spherical inelastic gamma source volume 306 (shown in the cross-sectional view of FIG. 3 as a circular region), and within the first source volume 306 inelastic gammas are created. Moreover, the generation and/or release of neutron can be considered to create a spherical capture gamma source volume 318 (again shown in the cross-sectional view of FIG. 3 as a circular region), and within the second source volume 306 capture gammas are created.

In example systems, 14 MeV neutrons are emitted from the neutron source, and the neutrons go through scattering events till capture. The scattering events may give rise to the generation of gammas, which then propagate through the formation, and some of gammas are incident upon the detectors. Consider an example neutron generated and/or released from the source 302. When generated and/or released from the source 302, an example travel path for the neutron is represented by arrow 301. When a neutron scatters with a nucleus of heavier earth elements, such as Oxygen, Silicon and Calcium, inelastic collisions with the nuclei may occur within an inelastic gamma source volume 306. Source volume 306 can be considered spherical for ease of conception; however, the shape of the region in which gamma production by inelastic neutron scattering occurs need not necessarily be spherical and may vary in shape depending, for example, on the structure and composition of the formation and the geometry of the pulsed neutron source. A spherical region might be expected for a substantially isotropic neutron source and medium. A neutron making an inelastic collision at 308, for example, loses energy to the struck nucleus. Although the neutron is depicted as undergoing an inelastic collision at the edge of source volume 306, inelastic collisions occur throughout the source volume. As previously described, the struck nucleus emits the energy received from the neutron in the form of an inelastic gamma.

With respect to the inelastic gammas, some of these inelastic gammas reach a detector and are tallied therein, with particular time and energy. That is, the flux of inelastic gammas is attenuated as the gammas propagate through the formation such that only a portion of the gammas reach the detector. A gamma transmission efficiency model may be created that characterizes the attenuation, and in example cases the attenuation may be characterized by an exponential attenuation, such as shown by equation (1):

$$N_{Inel}=A_{Inel}e^{-\rho\mu L_{Inel}} \quad (1)$$

where $N_{Inel}$ is the inelastic count rate, $A_{Inel}$ is a value indicative of the inelastic gammas in the source volume initially moving toward the detector, $\rho$ is formation density, $\mu$ is formation mass attenuation coefficient, and $L_{Inel}$ is the attenuation distance between the inelastic source region and the detector. The attenuation distance may schematically be represented by the length of track 312 from source region 306 to detector 314.

Still referring to FIG. 3, a neutron having inelastically scattered off of constituent nuclei of the formation and additionally lost energy via elastic collisions may undergo thermal capture within the capture source volume 318, for example, at 316. Source volume 318 can be considered spherical for ease of conception; however, the shape of the region in which gamma production by neutron capture occurs need not necessarily be spherical and may vary in shape depending, for example, on the structure and composition of the formation and the geometry of the pulsed neutron source. Moreover, source volume 318 in the example situation subsumes inelastic source volume 306. Although the neutron is depicted as undergoing a capture collision at 316 at the edge of source volume 318, capture events can occur throughout the source volume 318. The capture gamma emitted when the excited target nucleus decays also propagates through formation 310, as schematically illustrated by track 320.

As with the inelastic gammas, a gamma transmission efficiency model for the capture gammas may be created that characterizes the attenuation as the gammas travel toward the detector, and in example cases the attenuation may be characterized by an exponential attenuation, such as shown by equation (2):

$$N_{Cap}=A_{Cap}e^{-\rho\mu L_{Cap}} \quad (2)$$

where $N_{Cap}$ is the capture count rate, $A_{Cap}$ is a value indicative of the capture gammas in the source volume initially moving toward the detector, $\rho$ is formation density, $\mu$ is formation mass attenuation coefficient, and $L_{Cap}$ is the attenuation distance for capture gammas. The attenuation distance $L_{Cap}$ may schematically be represented by the length of track 320 from source region 318 to detector 314.

The effects of hydrogen index on $N_{Inel}$ and $N_{Cap}$ are complex. Higher hydrogen index results in smaller source volumes or clouds, and therefore longer attenuation distances. Longer attenuation distance causes both $N_{Inel}$ and $N_{cap}$ to decrease. However, higher hydrogen index implies lower formation density. Because the hydrogen index relates to hydrogen-bearing compounds in the formation, the hydrogen index is representative of constituents held in void spaces within the rock matrix. Further, the hydrogen-bearing constituents are less dense than the rock matrix and, consequently, the density of a formation including voids containing hydrogen-bearing constituents would be lower than the density of a formation without such voids. Lower formation density causes both $N_{Inel}$ and $N_{cap}$ to increase. The effects of longer attenuation distance tending to decrease count rates, and lower density tending to increase count rates, compete against each other as the hydrogen index varies from 0 (hard rock) to 1 (water).

In related-art systems, hydrogen index is computed using ratios between $N_{cap}$ of two or more gamma detectors at different spacing. The ratio of $N_{cap}$ of two or more differently-spaced gamma detectors is more sensitive to hydrogen index than inelastic ratios for the reason of a larger source volume or cloud, as schematically depicted in FIG. 3. However, at medium to high hydrogen index, the aforementioned increase in attenuation length with hydrogen index begins to out-compete the decrease in formation density. Consequently, the sensitivity of the capture ratio to the hydrogen index begins to diminish, as illustrated by FIG. 4.

Figure 4:
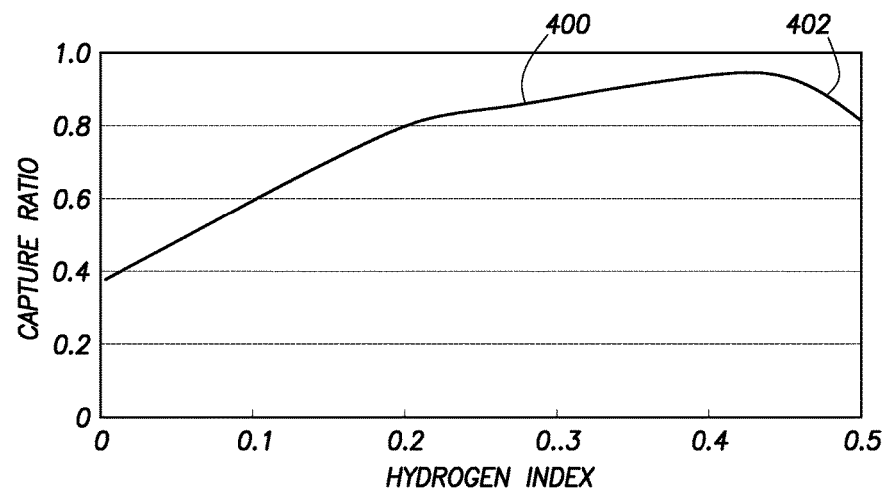
FIG. 4 shows an illustrative relationship between capture ratio across two detectors to hydrogen index to show shortcomings of related-art systems.

FIG. 4 show a graph of the ratio of $N_{cap}$ of two or more differently-spaced gamma detectors (in the graph, "capture ratio") to the hydrogen index to describe shortcomings of related-art devices. In particular, FIG. 4 shows a flattening of the example capture-ratio-versus-hydrogen-index curve in FIG. 4 in region 400. Thus, determining hydrogen index based on capture ratios of two differently-spaced gamma detectors becomes difficult in region 400. Moreover, the capture ratio curve can even become non-monotonic, as illustrated by region 402 in the example of FIG. 4, at hydrogen index values between about 0.4 and 0.5. Stated otherwise, using the ratio of $N_{cap}$ of two or more differently-spaced gamma detectors, one may not be able to distinguish where on the non-monotonic example curve the solution resides.

Figure 5:
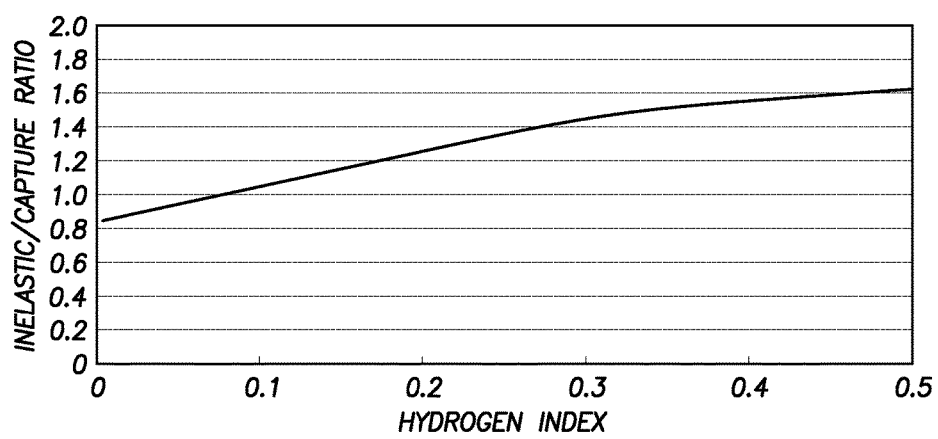
FIG. 5 shows an illustrative relationship between inelastic and capture ratio (from a single gamma detector) to hydrogen index in accordance with at least some embodiments.

By contrast, the various embodiments use a ratio of inelastic gammas to capture gammas to determine hydrogen index. The source size differences as illustrated in FIG. 3 for example, may be the main driving force for $N_{Inel}$ and $N_{cap}$ to vary differently as hydrogen index varies. In other words, because the source size for inelastic gammas may be less sensitive to hydrogen index, the ratio between $N_{Inel}$ and $N_{cap}$ continues to reflect a difference between the source sizes even as increasing hydrogen index diminishes the source sizes. Consequently, the ratio between $N_{Inel}$ and $N_{cap}$ maintains good sensitivity to hydrogen index. FIG. 5 illustrates an example plot of inelastic to capture ratio versus hydrogen index. As shown therein, the inelastic to capture ratio sensitivity is maintained from low to high hydrogen index values, and, further, does not exhibit the non-monotonic behavior seen in the example of FIG. 4. Thus, in accordance with at least some embodiments, an indication of hydrogen index may be determined with a pulsed-neutron tool based on inelastic to capture ratio from a single detector.

Figure 6:
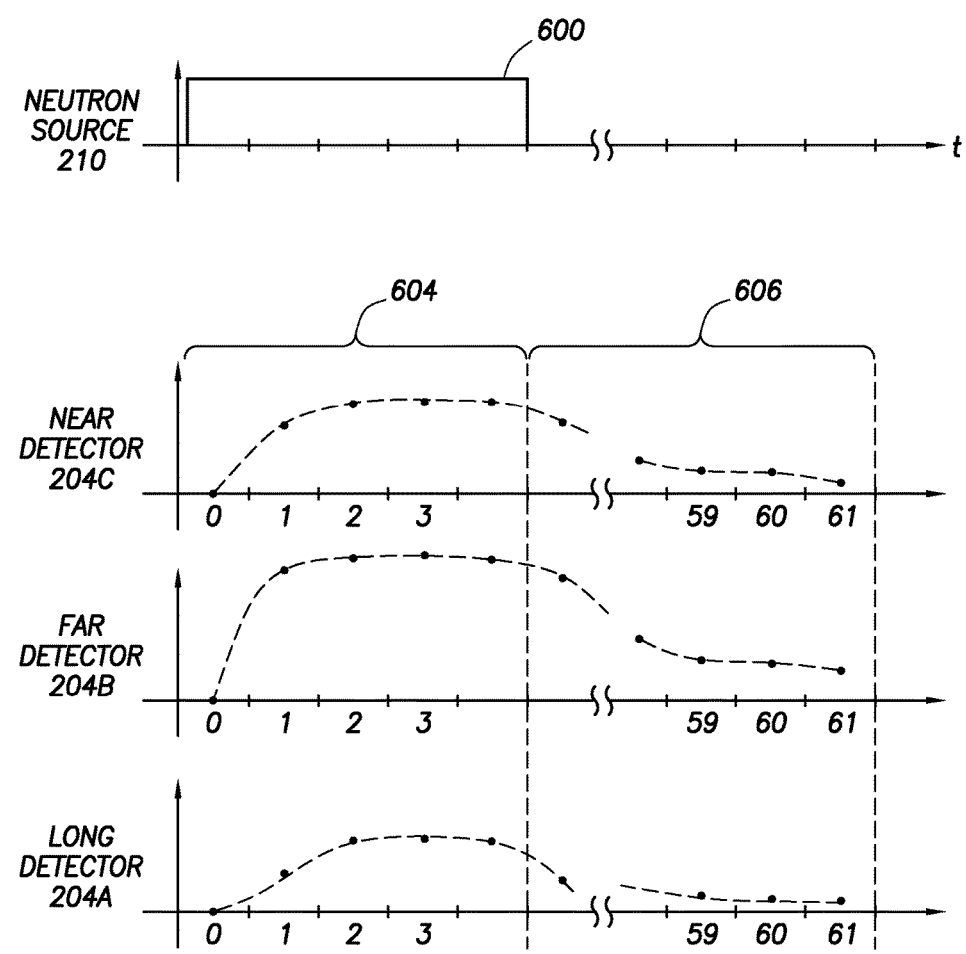
FIG. 6 shows graphs illustrative of a count rate as a function of time in accordance with at least some embodiments.

The acquisition of gamma counts may be further understood by referring to FIG. 6 depicting graphs of temporal histories of gamma fluxes at the three detectors 204A-204C generated by a neutron pulse from the PNT. The graphs qualitatively show the behavior in time of gammas incident on the respective detectors in accordance with at least some embodiments of the disclosure. In particular, FIG. 6 shows a graph relating to activation of the neutron source 210, as well as gamma count rates for the near detector 204C, the far detector 204B, and the long detector 204A. The graph with respect to the neutron source 210 is Boolean in the sense that it shows when the neutron source is generating and/or releasing neutrons (i.e., the burst period), and when the neutron source is not. In particular, with respect to the neutron source graph, the neutron source is generating and/or releasing neutrons during the asserted state 600, and the neutron source is off during the remaining time. In accordance with the various embodiments, a single interrogation (at a particular borehole depth) comprises activating the neutron source for a predetermined amount of time (e.g., 80 microseconds) and counting the number of gamma arrivals by at least one of the detectors during the activation time of the neutron source and for a predetermined amount of time after the source is turned off. In at least some embodiments, the total amount of time for a single interrogation (i.e., a single firing of the neutron source and the predetermined amount of time after the neutron source is turned off) may span approximately 1250 microseconds (μs), but other times may be equivalently used.

Still referring to FIG. 6, with respect to counting gamma arrivals by the gamma detectors 204, the interrogation time is divided into a plurality of time slots or time bins. With reference to the graph for the long detector 204A as illustrative of all the gamma detectors, in some embodiments the interrogation time is divided into 61 total time bins. In accordance with at least some embodiments, the first 32 time bins each span 10 μs, the next 16 time bins each span 20 μs, and the remaining time bins each span 50 μs. Other numbers of time bins, and different time bin lengths, may be equivalently used. For example, in at least some embodiments, 125 bins each spanning 10 μs may be used. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, the gamma detector counts the gamma arrivals and increases the count value for the particular time bin for each gamma arrival. Once the time period for the time bin expires, the system starts counting anew the arrivals of gammas within the next time bin until count values for all illustrative 61 time bins have been obtained. In some cases, the system starts immediately again by activating the neutron source and counting further time bins; however, the count values within each time bin (for a particular borehole depth) are recorded either by way of the surface computer 22 in the case of wireline tools, or by the computer system 206 within the tool in the case of a MWD, LWD or slickline tool.

Illustrative count values for each time bin are shown in FIG. 6 as dots in the center of each time bin. The count value for each time bin is represented by the height of the dot above the x-axis (i.e., the y-axis value). Taking all the count values for a particular detector together, the dots may be connected by a line (shown in dashed form in FIG. 6) to guide the eye illustrative of the number of gamma arrivals as a function of time detected by the particular gamma detector. In accordance with the various embodiments, the plurality of count values is referred to as a gamma count rate decay curve. All the curves taken together (the curve for each gamma detector) may be referred to as full-set decay curves.

Because of the physics of the logging tool and the surrounding formation, within certain time periods certain types of gammas are more likely to be created, and thus more likely to be counted by the one or more active gamma detectors 204. For example, during the period of time within which the neutron source 210 is activated (as indicated by line 600), the energy of neutrons created and/or released leads predominantly to creation of inelastic gammas. The period of time in the gamma count rate decay curves where the gammas are predominantly inelastic gammas is illustrated by time period 604. Thus, gammas counted during some or all of the time period 604 may be considered inelastic gammas. Some capture gammas may be detected during the time period 604, and in some embodiments the minority presence of capture gammas may be ignored. In yet still other embodiments, because capture gammas are distinguishable from inelastic gammas based on energy, the portion of the count rate during time period 604 attributable to capture gammas may be removed algorithmically. And, further still, in other embodiments, the capture count during the time the neutron source is activated, which may also be termed the neutron burst period, may be estimated from the later capture count rate and projected back to the neutron burst period using relations known in the art.

Similarly, after the neutron source 210 is no longer activated, the average energy of the neutrons that make up the neutron flux around the tool 10 decreases, and the lower energy of the neutrons leads predominantly to creation of capture gammas. The period of time in the gamma count rate decay curves where the gammas are predominantly capture gammas is illustrated by time period 606. Thus, gammas counted during some or all of the time period 606 may be considered capture gammas. Some inelastic gammas may be detected during the time period 606, and in some embodiments the minority presence of inelastic gammas may be ignored. In yet other embodiments, because inelastic gammas are distinguishable from capture gammas based on energy, the portion of the count rate during time period 606 attributable to inelastic gammas may be removed algorithmically.

As described above, in accordance with the example systems, the ratio of counts of capture and inelastic gammas from a single detector is indicative of the hydrogen index of the formation. Consider a gamma count rate decay curve, such as the far detector 204B gamma count rate decay curve of FIG. 6. In accordance with the various embodiments, a ratio is taken of the inelastic count rate to the capture count rate of the gamma count rate decay curve. The inelastic count rate may be the summed count rate from one or more of the time bins within time period 604. In accordance with some embodiments, the count rates from all the time bins within time period 604 are summed and used as the inelastic count rate. The capture count rate may be the summed count rate from one or more of the time bins within time period 606. Capture and inelastic count rates for detectors 204B and 204C may be similarly obtained. In accordance with some embodiments, the count rates from time bins within time period 606 span 100 μs to 1000 μs after the deactivation of the neutron source 210. The ratio of these count rates is indicative of the hydrogen index of the formation at the location of the logging tool in the wellbore. In some embodiments, the ratio is the inelastic count rate divided by the capture count rate, and in other embodiments the ratio is the capture count rate divided by the inelastic count rate.

The logging tool 10 of FIG. 2 illustrates three gamma detectors 204. However, in at least some embodiments calculating the ratio and determining the value indicative of hydrogen index utilize the gamma counts from a single gamma detector. In some cases, the long detector 204A provides better gamma count rates for determining the value hydrogen index. The near detector may be about 12 inches from the pulsed neutron source, but may be as previously described be, in at least some embodiments from about 6 inches to 18 inches from neutron source. In at least some embodiments, the spacing between the neutron source and the far spaced detector may be from about 18 inches to about 36 inches. The sensitivity of the hydrogen index is somewhat improved at the larger spacing values, but may be offset by lower count rates, and a concomitant increase in statistical fluctuations. However, with, for example, sufficiently intense neutron sources, far-spaced detector distances even larger than 36 inches may be enabled. Thus, in alternative embodiments, other spacing may be used and such embodiments would fall within the principles described herein. Further, in at least some embodiments, the gamma count rates may be obtained from a plurality of detectors, for example the three detectors (204A-204C) in FIG. 2. A hydrogen index determination may be made by selecting the gamma count data from the detector yielding the desired sensitivity while maintaining count statistics such that the uncertainty in hydrogen index value so determined is not reduced by noise in the data.

Figure 7:
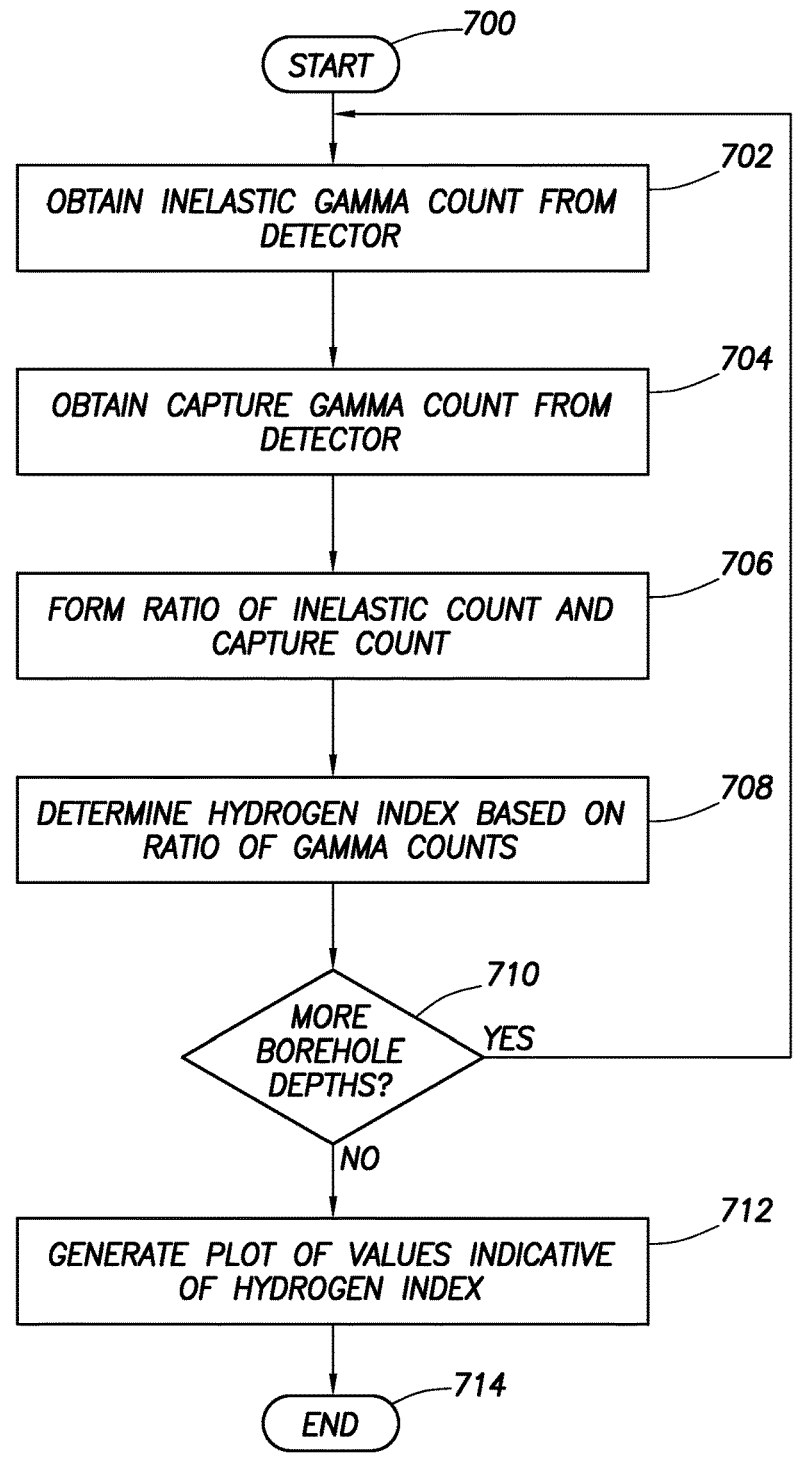
FIG. 7 shows a method in accordance with at least some embodiments.

FIG. 7, illustrates a flowchart of a method in accordance with an embodiment of the disclosure which may be at least in part performed by a computer system, such as surface computer 22 or computer system 206 in logging tool 10. The method starts, block 700 and proceeds to obtain an inelastic gamma count from a gamma detector, block 702. The detector may be selected from among a plurality of detectors in the logging tool, as previously described. For example, the detector may be far detector 204B or long detector 204A selected based on sensitivity to count statistics and the like. In block 704, a capture gamma count from the detector is obtained. The respective gamma counts may be obtained, in situ, by contemporaneous operation of the pulsed neutron source or, alternatively, by retrieval from a well log database containing pulsed neutron logging tool gamma count data. Further, in an embodiment, each of the aforementioned determinations may be made at a particular borehole depth. In yet another embodiment, the determinations may be made for a plurality of borehole depths. In block 706, the method forms a ratio of the inelastic gamma count and the capture gamma count. In an embodiment, the ratio may be formed by dividing the inelastic gamma count by the capture gamma count. In an alternative embodiment, the ratio may be formed by dividing the capture gamma count by the inelastic gamma count. The method proceeds at block 708 to determine a value indicative of a hydrogen index based on the value of the ratio calculated at block 706. If values indicative of a hydrogen index are to be determined for additional borehole depths, the method proceeds via the "Yes" branch of decision block 710 to block 702. Otherwise, the method proceeds by the "No" branch, and a plot of values indicative of a hydrogen index is generated, block 712, and the method ends at block 714.

FIG. 8 illustrates in greater detail a computer system 800, which is illustrative of both the surface computer system 22 and the computer system 206 within the logging tool 10. Thus, the computer system 800 described with respect to FIG. 8 could be proximate to the borehole during the time period within the tool 10 is within the borehole, the computer system 800 could be located at the central office of the oilfield services company, or the computer system 800 could be within the logging tool 10 (such as for LWD or MWD tools). The computer system 800 comprises a processor 802, and the processor couples to a main memory 804 by way of a bridge device 808. Moreover, the processor 802 may couple to a long term storage device 810 (e.g., a hard drive) by way of the bridge device 808. Programs executable by the processor 802 may be stored on the storage device 810, and accessed when needed by the processor 802. The program stored on the storage device 810 may comprise programs to implement the various embodiments of the present specification, including programs to implement selecting a gamma detector to use in the hydrogen index determination, calculating the ratio of the inelastic gamma count rate to capture gamma count rate for one or more of the detectors, calculating the value of indicative of hydrogen index and producing a plot of the value indicative of hydrogen index. In some cases, the programs are copied from the storage device 810 to the main memory 804, and the programs are executed from the main memory 804. Thus, both the main memory 804 and storage device 810 are considered computer-readable storage mediums. The ratios and values indicative of hydrogen index generated by the computer system 810 may be sent to a plotter that creates a paper-log, or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable media (i.e., not a carrier wave) that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, preprocessing of the data may take place, such as dead-time correction and environmental correction, without affecting scope of this specification. It is intended that the following claims be interpreted to embrace all such variations and modifications.

We claim:

1. A method for identifying a value indicative of a hydrogen index of a formation with a borehole extending therethrough, the method comprising:
    counting both inelastic gammas and capture gammas with a gamma detector for a particular borehole depth;
    determining an inelastic count rate, using a processor, based, in part, on the inelastic gamma count and an attenuation distance between an inelastic source region and the gamma detector;
    determining a capture count rate, using the processor, based, in part, on the capture gamma count and an attenuation distance between a gamma source region and the gamma detector;
    calculating a ratio of the inelastic count rate to the capture count rate for the particular borehole depth;
    determining a value indicative of the hydrogen index of the formation, using the processor, based on the ratio; and
    interpreting the value indicative of the hydrogen index, using the processor, to determine a property of the formation.

2. The method of claim 1 further comprising producing a plot of the value indicative of the hydrogen index of the formation as a function of borehole depth.

3. The method of claim 1 further comprising obtaining a gamma count decay curve of the gamma detector to determine the inelastic count rate and the capture count rate.

4. The method of claim 1 wherein determining the inelastic count rate and the capture count rate further comprises determining the count rates from a database of well log data based on operation of a nuclear logging tool non-contemporaneously with determining the count rates.

5. The method of claim 1 further comprising operating a nuclear logging tool in the borehole contemporaneously with the calculating.

6. The method of claim 1 wherein the gamma detector is disposed from about 12 inches to about 36 inches from a pulsed neutron source.

7. The method of claim 1 further comprising selecting the gamma detector based on a signal quality of the inelastic count rate and the capture count rate from each of a plurality of gamma detectors.

8. The method of claim 1 wherein the calculating further comprises calculating the ratio based upon the capture count rate of the gamma detector at least partially between 100 microseconds and 1000 microseconds after a neutron burst period.

9. A system for use downhole within a borehole through a formation, the system comprising:
    a downhole tool comprising a source of neutrons and a gamma detector, the gamma detector configured to count both inelastic gammas and determine an inelastic count rate based, in part, on the count of inelastic gammas and count capture gammas and determine a capture count rate count based, in part, on the count of capture gammas;
    a processor coupled to a memory and to the gamma detector;
    the memory storing a program that, when executed by the processor, causes the processor to:
        calculate a ratio of the inelastic count rate to the capture count rate of the gamma detector for a particular depth within the borehole; and
        determine a value indicative of a hydrogen index of the formation based on the ratio.

10. The system of claim 9 wherein the program further causes the processor to produce a plot of the value indicative of the hydrogen index of the formation as a function of the particular borehole depth.

11. The system of claim 9 wherein the gamma detector is disposed from between 12 to 36 inches inclusive from a pulsed neutron source.

12. The system of claim 9 wherein when the processor calculates the ratio of the inelastic count rate to the capture count rate, the program further causes the processor to calculate the ratio based upon the capture count rate from the gamma detector at least partially between 100 microseconds and 1000 microseconds after a neutron burst period.

13. The system of claim 9 wherein the program further causes the processor to select the gamma detector from a plurality of gamma detectors based on a signal quality of the inelastic count rate and the capture count rate from each of the plurality of gamma detectors.

14. The system of claim 9 wherein the program further causes the processor to operate a nuclear logging tool in the borehole contemporaneously with causing the processor to calculate the ratio.

15. The system of claim 9 wherein the program further causes the processor to obtain the inelastic count rate and the capture count rate from a database of count rates based on operation of a nuclear logging tool non-contemporaneously with the count rates.

16. A non-transitory computer readable storage medium storing a program that, when executed by a processor, causes the processor to:
    obtain both an inelastic count rate and a capture count rate from a gamma detector for a particular borehole depth in a formation;
    calculate a ratio of an inelastic count rate to a capture count rate for the particular borehole depth;
    determine a value indicative of a hydrogen index of the formation based on the ratio;
    wherein the gamma detector is operable to determine an inelastic count rate based, in part, on a count of inelastic gammas and an attenuation distance between an inelastic source region and the gamma detector; and
    wherein the gamma detector is operable to determine a capture count rate based, in part, on a count of capture gammas and an attenuation distance between a gamma source region and the gamma detector.

17. The non-transitory computer readable storage medium of claim 16 wherein, when the processor obtains, the program further causes the processor to obtain a gamma count decay curve of the gamma detector.

18. The non-transitory computer readable storage medium of claim 16 wherein the program when executed by the processor, further causes the processor to operate a nuclear logging tool in the borehole contemporaneously with causing the processor to calculate the ratio.

19. The non-transitory computer readable storage medium of claim 16 wherein, when the processor calculates, the program further causes the processor to calculate the ratio based upon the capture count rate of the gamma detector at least partially between 100 microseconds and 1000 microseconds after a neutron burst period.

20. The non-transitory computer readable storage medium of claim 16 wherein, when the processor obtains, the program further causes the processor to obtain from a database of count rates based on operation of a nuclear logging tool non-contemporaneously with the count rates.

* * * * *